United States Patent
Higashi et al.

(10) Patent No.: US 7,735,597 B2
(45) Date of Patent: Jun. 15, 2010

(54) STEERING APPARATUS FOR VEHICLE

(75) Inventors: Kenji Higashi, Tenri (JP); Kosuke Yamanaka, Kashihara (JP); Atsushi Ishihara, Yamatokoriyama (JP); Daisuke Maeda, Kashiwara (JP)

(73) Assignee: JTEKT Corporation, Osaka (JP)

( * ) Notice: Subject to any disclaimer, the term of this patent is extended or adjusted under 35 U.S.C. 154(b) by 221 days.

(21) Appl. No.: 11/798,550

(22) Filed: May 15, 2007

(65) Prior Publication Data

US 2007/0261909 A1    Nov. 15, 2007

(30) Foreign Application Priority Data

May 15, 2006  (JP) .............................. 2006-135319
Sep. 25, 2006  (JP) .............................. 2006-259444

(51) Int. Cl.
*B62D 5/04* (2006.01)
(52) U.S. Cl. ..................... 180/444; 180/441; 180/443
(58) Field of Classification Search ................. 180/444, 180/443, 441
See application file for complete search history.

(56) References Cited

U.S. PATENT DOCUMENTS

| 4,751,976 | A | 6/1988 | Higuchi et al. | |
|---|---|---|---|---|
| 6,199,654 | B1 * | 3/2001 | Kojo et al. | 180/443 |
| 6,896,090 | B2 * | 5/2005 | Kanda et al. | 180/402 |
| 6,904,999 | B2 * | 6/2005 | Kojo et al. | 180/422 |
| 7,275,617 | B2 * | 10/2007 | Endo et al. | 180/402 |
| 7,306,535 | B2 * | 12/2007 | Menjak et al. | 475/29 |
| 7,377,875 | B2 * | 5/2008 | Shiina et al. | 475/339 |
| 7,479,089 | B2 * | 1/2009 | Yamanaka et al. | 475/344 |
| 2004/0070189 | A1 * | 4/2004 | Nakatsu et al. | 280/771 |
| 2005/0037884 | A1 * | 2/2005 | Hermann et al. | 475/18 |
| 2005/0155812 | A1 * | 7/2005 | Yamamori et al. | 180/444 |
| 2005/0178607 | A1 * | 8/2005 | Kodama et al. | 180/422 |
| 2005/0205340 | A1 * | 9/2005 | Shimoyama et al. | 180/444 |
| 2005/0288142 | A1 * | 12/2005 | Yamanaka et al. | 475/4 |
| 2006/0135312 | A1 * | 6/2006 | Shiina et al. | 475/339 |
| 2006/0166771 | A1 * | 7/2006 | Yamanaka et al. | 475/4 |

FOREIGN PATENT DOCUMENTS

| EP | 1 693 599 A1 | 8/2006 |
|---|---|---|
| FR | 2 894 549 | 6/2007 |
| JP | 2002-240729 | 8/2002 |
| JP | 2004-224085 | 8/2004 |
| JP | 2005-225402 | 8/2005 |
| JP | 2005-343205 | 12/2005 |

* cited by examiner

*Primary Examiner*—Lesley Morris
*Assistant Examiner*—Tashiana Adams
(74) *Attorney, Agent, or Firm*—Rabin & Berdo, PC

(57) ABSTRACT

A steering apparatus for vehicle comprises a steering shaft including a first portion connected to a steering member and a second portion connected to steerable wheels; a transmission ratio variable mechanism capable of varying a transmission ratio as a ratio of a steered angle of the steerable wheels to a steering angle of the steering member; and a reaction-force compensation motor for compensating a steering reaction force of the steering member caused by the operation of the transmission ratio variable mechanism. The transmission ratio variable mechanism includes a differential mechanism for differentially rotatably interconnecting the first and second portions; and a differential-mechanism motor for driving the differential mechanism. Both an axis of a rotary shaft of the differential-mechanism motor and an axis of a rotary shaft of the reaction-force compensation motor are aligned with an axis of the steering shaft.

22 Claims, 13 Drawing Sheets

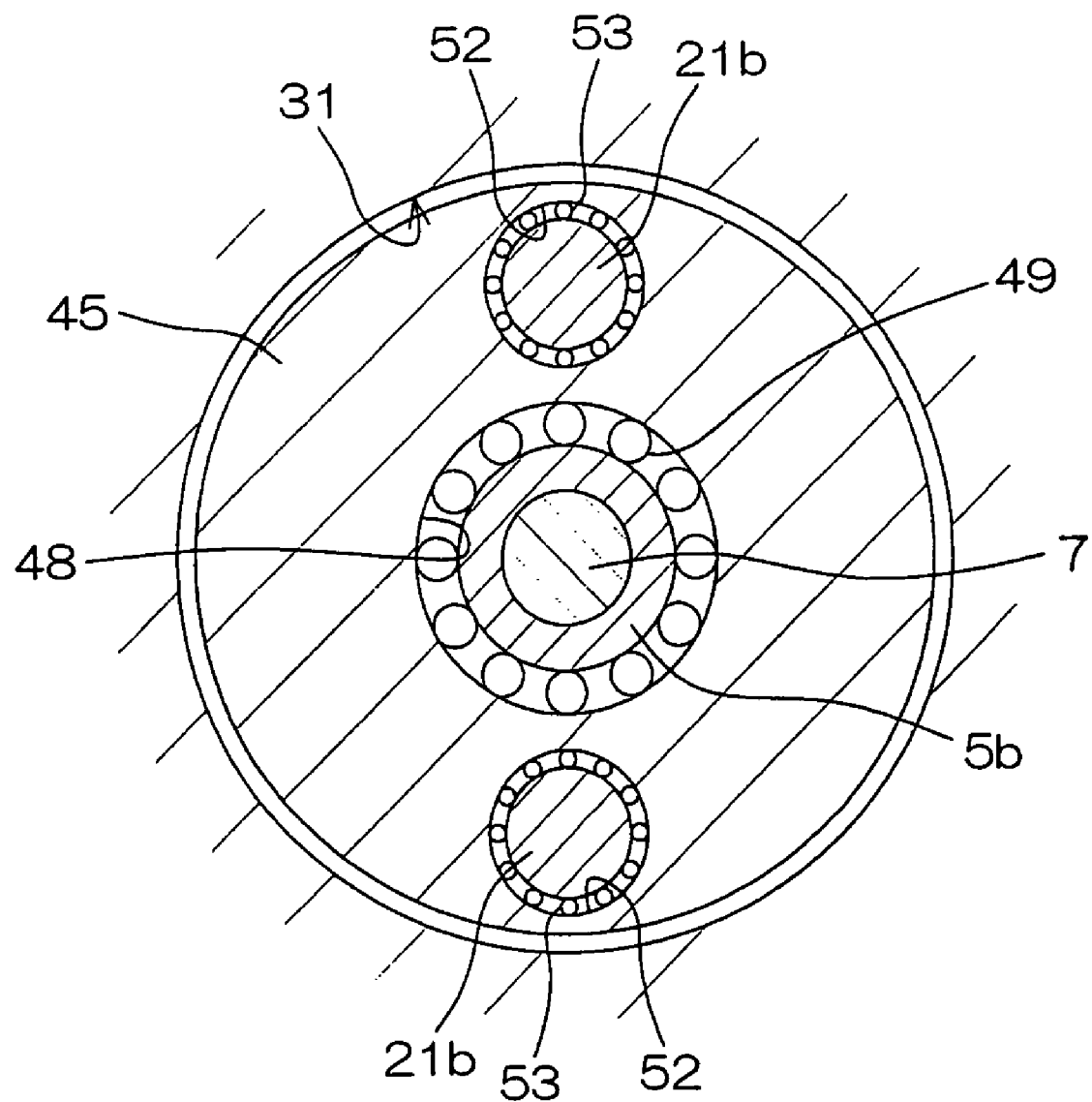

STEERING APPARATUS FOR VEHICLE

BACKGROUND OF THE INVENTION

1. Field of the Invention

The present invention relates to a steering apparatus for vehicle adapted to vary a ratio of a steered angle of steerable wheels to a steering angle of a steering member.

2. Description of Related Arts

The above steering apparatus for vehicle is shown in the following documents 1 to 3.

Document 1: Japanese Unexamined Patent Publication No. 2002-240729

Document 2: Japanese Unexamined Patent Publication No. 2004-224085

Document 3: Japanese Unexamined Patent Publication No. 2005-343205

The above document 3 discloses an arrangement comprising: a first shaft connected with a steering wheel; a second shaft connected to vehicle wheels; and a planet gear mechanism for rotation-transmittably interconnecting the first and second shafts. The planet gear mechanism comprises: a first sun gear fixed to the first shaft; a second sun gear fixed to the second shaft; a plurality of pinions disposed around the first and second shafts; and a carrier enclosing the pinions. The rotation of the steering wheel is transmitted to the first shaft, the first sun gear, the pinions, the second sun gear and the second shaft in this order and is finally transmitted to the vehicle wheels.

A transmission ratio of the planet gear mechanism (a ratio of the number of revolution of the second sun gear to the number of revolutions of the first sun gear) may be varied by a first motor driving the carrier into rotation. An output from the first motor is transmitted to the carrier via a small gear connected with an output shaft of the first motor, and a toothed portion formed on an outer periphery of the carrier and meshed with the small gear. Thus the number of revolutions of the carrier is varied.

In a case where the transmission ratio is varied in the aforementioned manner, speed shifting is carried out between the first and second shafts. As a result, a relation between the steering angle and the reaction force from the vehicle wheels is varied from that in a state prior to the change of transmission ratio. The characteristic of the reaction force varies irrespective of the intent of a driver, and a driver has an uncomfortable steering feeling. In order to eliminate this uncomfortable steering feeling, an arrangement is made such that a second motor is provided and an output from the second motor is transmitted to the first shaft via a reduction mechanism including a small gear and a large gear. Thus the variations of the characteristic of the reaction force are prevented.

In the case of the document 3, however, the first and second motors oppose to each other with the steering shaft interposed therebetween. The housings of these motors are protruded radially of the steering shaft so that the system is increased in size.

In view of the foregoing, the invention has an object to provide a steering apparatus for vehicle achieving size reduction.

SUMMARY OF THE INVENTION

According to a preferred embodiment of the invention for achieving the above object, a steering apparatus for vehicle comprises a steering shaft including a first portion connected to a steering member and a second portion connected to steerable wheels, a transmission ratio variable mechanism capable of varying a transmission ratio as a ratio of a steered angle of the steerable wheels to a steering angle of the steering member, and a reaction-force compensation motor for compensating a steering reaction force of the steering member caused by the operation of the transmission ratio variable mechanism. The transmission ratio variable mechanism includes a differential mechanism for differentially rotatably interconnecting the first and second portions, and a differential-mechanism motor for driving the differential mechanism. Both an axis of a rotary shaft of the differential-mechanism motor and an axis of a rotary shaft of the reaction-force compensation motor are aligned with an axis of the steering shaft.

According to the embodiment, both the differential-mechanism motor and the reaction-force compensation motor can be disposed in a manner to surround the steering shaft. Thus, the above motors may not be disposed in an opposed relation to each other with the steering shaft interposed therebetween. This results in the reduction of space occupied by these motors with respect to the radial direction of the steering shaft. Thus the size reduction of the steering apparatus for vehicle is achieved.

BRIEF DESCRIPTION OF THE DRAWINGS

FIG. 4 is a sectional view taken on the line IV-IV in FIG. 2;

DETAILED DESCRIPTION OF THE PREFERRED EMBODIMENTS

The preferred embodiments of the present invention will be described with reference to the accompanying drawings.

Figure 1:
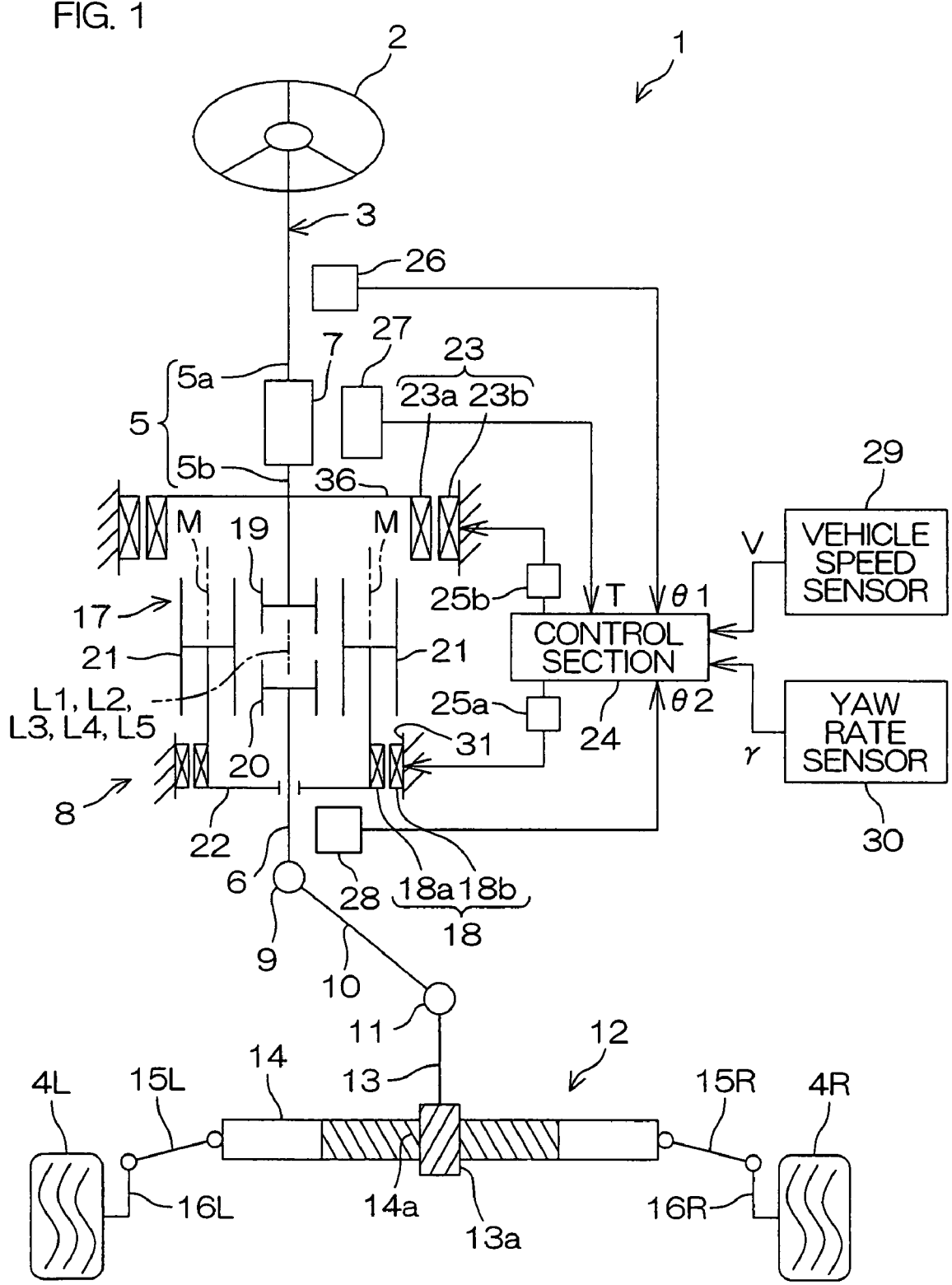
FIG. 1 is a schematic diagram showing a schematic arrangement of a steering apparatus for vehicle according to one embodiment of the present invention.

FIG. 1 is a schematic diagram showing a schematic arrangement of a steering apparatus for vehicle 1 according to one embodiment of the present invention. Referring to FIG. 1, the steering apparatus for vehicle 1 performs vehicle steering by applying a steering torque applied to a steering member 2, such as a steering wheel, to respective right and left steerable wheels 4L, 4R via a steering shaft 3 as a steering shaft and the like. The steering apparatus for vehicle 1 has a VGR (Variable Gear Ratio) function to vary a transmission ratio $\theta 2/\theta 1$ which is a ratio of a steered angle $\theta 2$ of the steerable wheels 4L, 4R to a steering angle $\theta 1$ of the steering member 2.

The steering apparatus for vehicle 1 comprises the steering member 2, and the steering shaft 3 connected with the steering member 2. The steering shaft 3 comprises a first shaft 5 as a first portion, and a second shaft 6 as a second portion.

An axis of the first shaft 5 is aligned with an axis of the second shaft 6. These axes constitute an axis L1 of the steering shaft 3.

The first shaft 5 comprises an input shaft 5a as an input member to which the steering torque from the steering member 2 is inputted, and an output shaft 5b as an output member relatively rotatably connected with the input shaft 5a via a torsion bar spring 7 and outputting the above steering torque.

An allowable value of the relative rotation between the input shaft 5a and the output, shaft 5b with the torsion bar spring 7 is a small value. Therefore, the input shaft 5a and the output shaft 5b may be thought to rotate substantially together.

A transmission ratio variable mechanism 8 is provided between the output shaft 5b of the first shaft 5 and the second shaft 6. A rotation transmission ratio (transmission ratio $\theta 2/\theta 1$) between these output shaft 5b and second shaft 6 can be varied by the transmission ratio variable mechanism 8. The second shaft 6 is connected to the steerable wheels 4L, 4R via a universal joint 9, an intermediate shaft 10, a universal joint 11 and a steering mechanism 12.

The steering mechanism 12 comprises a pinion shaft 13 connected with the universal joint 11, a rack shaft 14 as a steerable shaft including rack 14a meshed with a pinion 13a at a distal end of the pinion shaft 13 and extending transversely of a vehicle, and knuckle arms 16R, 16L connected to a pair of ends of the rack shaft 14 via tie rods 15R, 15L, respectively.

The above arrangement is adapted to transmit the steering torque from the steering member 2 to the steering mechanism 12 via the first shaft 5, transmission ratio variable mechanism 8, second shaft 6 and the like. In the steering mechanism 12, the rotation of the pinion 13a is converted into an axial motion of the rack shaft 14 so as to move the respective tie rods 15R, 15L for turning the corresponding knuckle arms 16R, 16L. Thus, the steerable wheels 4L, 4R connected with the corresponding knuckle arms 16R, 16L are steered, respectively.

The transmission ratio variable mechanism 8 comprises a planet gear mechanism 17 as a differential mechanism for differentially rotatably interconnecting the output shaft 5b of the first shaft 5 and the second shaft 6, and a planet-gear-mechanism motor 18 as a differential-mechanism motor for driving the planet gear mechanism 17.

The planet gear mechanism 17 is provided as a planet transmission mechanism and has an axis L2 aligned with the axis L1 of the steering shaft 3. The planet gear mechanism comprises: a first sun gear 19 (first gear) as a first element rotatable together with the output shaft 5b; a second sun gear 20 (second gear) as a second element having an axis L3 aligned with the above axis L1, disposed in opposed relation to the first sun gear 19 and rotatable together with the second shaft 6; a planet gear 21 as a third element meshed with both the first and second sun gears 19, 20; and a carrier 22 supporting the planet gear 21 rotatably about its axis M and supported rotatably about the axis L2 of the first sun gear 19.

The first and second sun gears 19, 20 and the planet gear 21 comprise, for example, spur gears. The first sun gear 19 is connected to the steering member 2 via the first shaft 5, whereas the second sun gear 20 is connected to the steerable wheels 4L, 4R via the second shaft 6 and the like.

The above gears 19, 20, 21 may also employ other gears, such as helical gears, which have mutually parallel axes.

The planet gear 21 is used for associating the first and second sun gears 19, 20 with each other. A plurality of the planet gears 21 (two according to the present embodiment) are arranged with equal spacing in a circumferential direction of the steering shaft 3. The axis M of each planet gear 21 extends in parallel with the axis L1 of the steering shaft 3. The carrier 22 is rotatable about the axis L1 of the steering shaft 3.

The planet-gear-mechanism motor 18 is used for driving the carrier 22 into rotation. The transmission ratio $\theta 2/\theta 1$ may be varied by varying the rotational speed of the carrier 22. The planet-gear-mechanism motor 18 comprises a brushless motor, for example.

The planet-gear-mechanism motor 18 includes a rotor 18a fixed to the carrier 22 so as to be able to rotate together therewith, and a stator 18b surrounding the rotor 18a and fixed to a housing 31.

The carrier 22 constitutes a rotary shaft of the planet-gear-mechanism motor 18. An axis L4 of the carrier 22 is aligned with the axis L1 of the steering shaft 3.

The steering apparatus for vehicle 1 further comprises a reaction-force compensation motor 23. The reaction-force compensation motor 23 is used for compensating a steering reaction force acting on the steering member 2 in association with the operation of the transmission ratio variable mechanism 8. The reaction-force compensation motor 23 comprises a brushless motor, for example.

The reaction-force compensation motor 23 includes a rotor 23a connected with the output shaft 5b of the first shaft 5 so that they can rotate together, and a stator 23b surrounding the rotor 23a and fixed to the housing 31. The rotor 23a is fixed to a retaining cylinder 36 rotatable together with the output shaft 5b. The retaining cylinder 36 constitutes a rotary shaft of the reaction-force compensation motor 23. An axis L5 of the retaining cylinder 36 is aligned with the axis L1 of the steering shaft 3.

One of the features of the present embodiment is that both the axis L4 of the carrier 22 as the rotary shaft of the planet-gear-mechanism motor 18 and the axis L5 of the retaining cylinder 36 as the rotary shaft of the reaction-force compensation motor 23 are aligned with the axis L1 of the steering shaft 3.

The planet-gear-mechanism motor 18 and the reaction-force compensation motor 23 are each controlled by a control section 24 including a CPU, RAM and ROM. The control section 24 is connected to the planet-gear-mechanism motor 18 via a driving circuit 25a and is connected to the reaction-force compensation motor 23 via a driving circuit 25b.

The control section 24 is further connected with a steering angle sensor 26, a torque sensor 27, a steered angle sensor 28, a vehicle speed sensor 29 and a yaw rate sensor 30.

The steering angle sensor 26 outputs a signal indicating a rotation angle of the input shaft 5a of the first shaft as a value corresponding to a steering angle $\theta 1$ representing an operation amount of the steering member 2 from a straight traveling position thereof. The torque sensor 27 outputs a signal indicating a torque acting on the first shaft 5 as a value corresponding to a steering torque T of the steering member 2. The steered angle sensor 28 outputs a signal indicating a rotation angle of the second shaft 6 as a value corresponding to a steered angle θ2. The vehicle speed sensor 29 outputs a signal indicating a vehicle speed V. The yaw rate sensor 30 outputs a signal indicating a yaw rate γ of the vehicle.

The control section 24 controls the drive of the planet-gear-mechanism motor 18 and the reaction-force compensation motor 23 as follows. Specifically, the control section 24 calculates a target yaw rate γT(=G×θ1; G denotes a predetermined transmission function) from the detected steering angle θ1. The control section also calculates a judgment value A=θ2×(γT-γ) from the target yaw rate γT, steered angle θ2 and the yaw rate γ.

In a case where the judgment value A is zero, the detected yaw rate γ is equal to the target yaw rate γT, thereby the vehicle is in a neutral steer state, the control section 24 drives the planet-gear-mechanism motor 18 so as to match the rotational speed of the carrier 22 with the rotational speed of the output shaft 5b of the first shaft 5. Thus, the transmission ratio θ2/θ1 is maintained at 1.

At this time, a relation between the steering angle θ1 and the steering torque T is not varied in association with the operation of the transmission ratio variable mechanism 8, and hence, there is no need for compensating the steering reaction force of the steering member 2. Accordingly, the control section does not drive the reaction-force compensation motor 23.

On the other hand, in a case where the judgment value A is a negative value, that is, the detected yaw rate γ exceeds the target yaw rate γT, and the vehicle is accordingly in an over-steer state, or in a case where the judgment value A is a positive value, that is, the detected yaw rate γ is bellow the target yaw rate γT, and the vehicle is accordingly in an understeer state, the control section 24 drives the planet-gear-mechanism motor 18 such that the carrier 22 is rotated at a different speed from that of the first shaft 5. Thus the transmission ratio θ2/θ1 is varied.

At this time, the relation between the steering angle θ1 and the steering torque T is varied in association with the operation of the transmission ratio variable mechanism 8. This causes the need for compensating the steering reaction force of the steering member 2. In this case, the control section 24 drives the reaction-force compensation motor 23. Thus, a compensation torque is applied to the first shaft 5 to compensate the steering reaction force. The reaction-force compensation motor 23 generates the compensation torque without varying the transmission ratio θ2/θ1.

Figure 2:
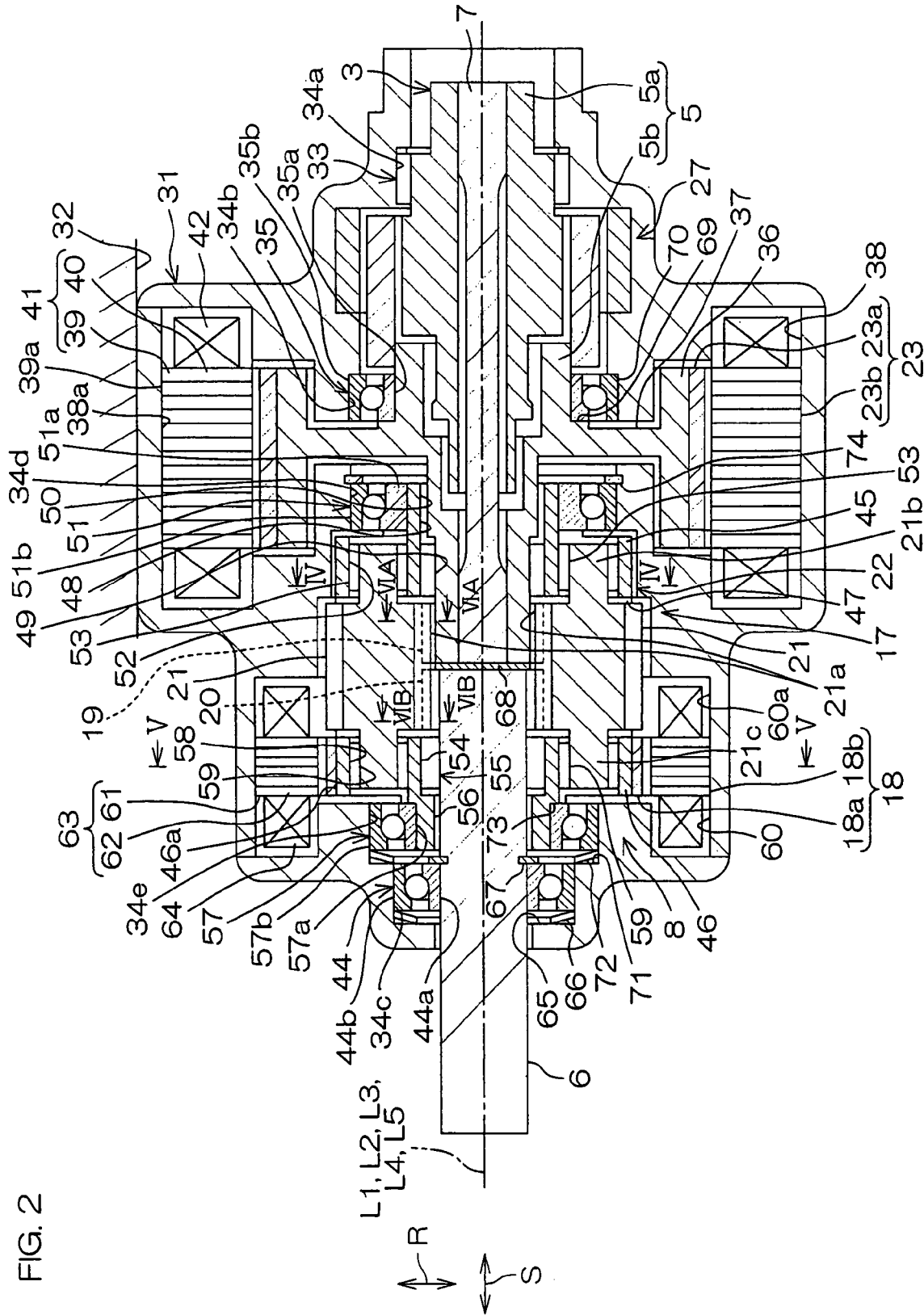
FIG. 2 is a sectional view showing a more specific arrangement of a principal part of FIG. 1.

FIG. 2 is a sectional view showing a more specific arrangement of a principal part of FIG. 1. Referring to FIG. 2, the first shaft 5, torque sensor 27, second shaft 6, planet gear mechanism 17 and the like are accommodated in the housing 31. The housing 31 is a cylindrical member formed from, for example, an aluminum alloy and is supported by a vehicle body 32.

The input shaft 5a of the first shaft 5 is inserted in the housing 31 and is rotatably supported by a support hole 34a of the housing 31 via a first bearing 33 comprising a roller bearing or the like. The output and surrounds a part of the input shaft 5a.

The output shaft 5b is rotatably supported by a support hole 34b of the housing 31 via a second bearing 35 comprising a roller bearing such as a single-row angular contact ball bearing or the like. The second bearing 35 has an inner ring 35a fitted around the output shaft 5b and has an outer ring 35b fitted in the support hole 34b of the housing 31.

The output shaft 5b is surrounded by the retaining cylinder 36 as the cylindrical member in a cylindrical shape. An intermediate portion of the retaining cylinder 36 and an intermediate portion of the output shaft 5b are interconnected via a coupling portion 37 so that they can rotate together. The coupling portion 37 may have an annular shape or may be formed of a plurality of spokes arranged in the circumferential direction of the output shaft 5b.

The rotor 23a of the reaction-force compensation motor 23 is fixed to an outer periphery of the retaining cylinder 36. The rotor 23a has a plurality of permanent magnets arranged in a circumferential direction thereof. Each of the permanent magnets is magnetized in a direction connecting the inside circumference and the outside circumference of the rotor. Adjacent magnets are magnetized in the opposite polarities to each other.

The stator 23b of the reaction-force compensation motor 23 is accommodated by a first groove 38 of the housing 31. That is, the housing 31 also serves as the housing of the reaction-force compensation motor 23. The stator 23b of the reaction-force compensation motor 23 includes a stator core 41 including an annular base 39 and a plurality of teeth 40 projecting inwardly from the base 39 (for example, six, two of the teeth 40 are shown in FIG. 2), and electromagnetic coils 42 wound about the respective teeth 40.

The base 39 has an outer periphery 39a fixed to an annular periphery 38a of the first groove 38 of the housing 31 by way of shrinkage fit or the like.

An intermediate portion of the second shaft 6 is rotatably supported by a support hole 34c of the housing 31 via a third bearing 44 comprising a single-row angular contact ball bearing or the like. The third bearing 44 has an inner ring 44a fitted about the second shaft 6 and has an outer ring 44b fitted in the support hole 34c of the housing 31.

The first sun gear 19 of the planet gear mechanism 17 is formed integrally with the output shaft 5b of the first shaft 5 by using a single member. The first sun gear is located at one end of the output shaft 5b. The second sun gear 20 is formed integrally with the second shaft 6 by using a single member and is located at one end of the second shaft 6.

Each planet gear 21 comprises a toothed portion 21a meshed with both the first and second sun gears 19, 20; and a pair of support shafts 21b, 21c oppositely projecting from the toothed portion 21a in an axial direction of the planet gear 21.

Figure 3A:
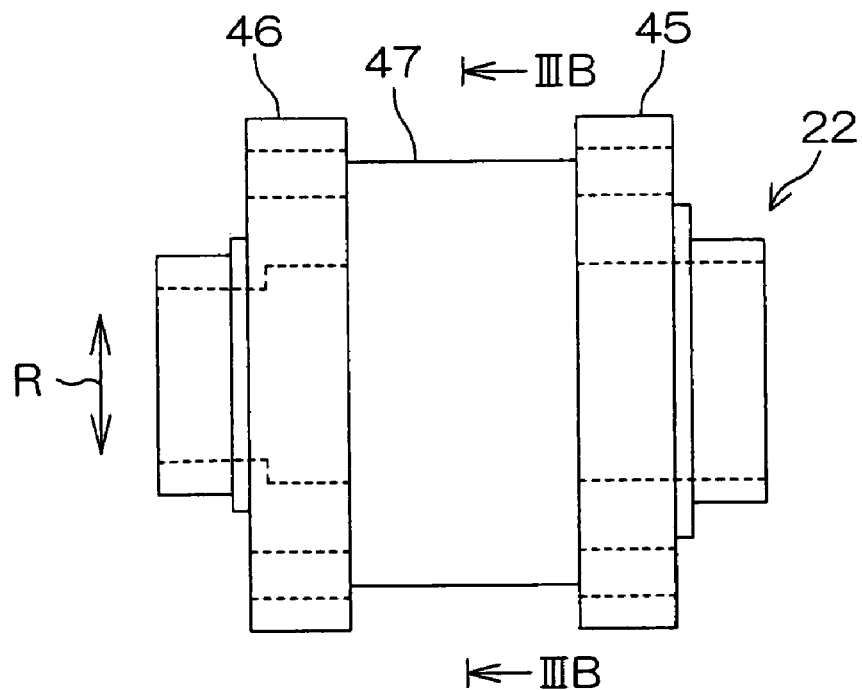
FIG. 3A is a side view of a carrier as a single item.
Figure 3B:
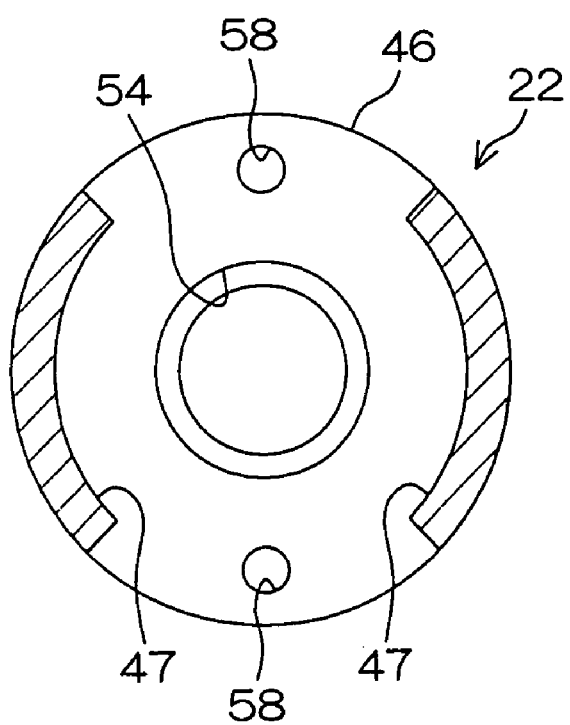
FIG. 3B is a sectional view taken on the line IIIB-IIIB in FIG. 3A.

FIG. 3A is a side view of the carrier 22 as a single item, and FIG. 3B is a sectional view taken on the line IIIB-IIIB in FIG. 3A. Referring to FIG. 2, FIG. 3A and FIG. 3B, the carrier 22 is so formed as not to project from the planet gear 21 with respect to a radial direction R of the steering shaft 3.

The carrier 22 comprises a first member 45 for supporting one support shaft 21b of each planet gear 21, a second member 46 for supporting the other support shaft 21c of each planet gear 21, and a coupling portion 47 for interconnecting the first member 45 and the second member 46 so that they can rotate together.

FIG. 4 is a sectional view taken on the line IV-IV in FIG. 2. Referring to FIG. 2 and FIG. 4, the first member 45 of the carrier 22 comprises a through-hole 48 through which the output shaft 5b of the first shaft 5 and the torsion bar spring 7 are inserted. A periphery of the through-hole 48 rotatably supports an outer periphery of the output shaft 5b via a fourth bearing 49 comprising a rolling bearing such as a roller bearing.

The first member 45 of the carrier 22 is formed with an annular flange 50. The flange 50 is rotatably supported by a support hole 34d of the housing 31 via a fifth bearing 51 comprising a rolling bearing such as a single-row angular contact ball bearing. The fifth bearing 51 has an inner ring 51a fitted about the flange 50 and has an outer ring 51b fitted in the support hole 34d of the housing 31. The fifth bearing 51 and the second bearing 35 are aligned with each other, with the coupling portion 37 sandwiched therebetween, with respect to an axial direction S of the steering shaft 3. These fifth and second bearings 51, 35 are disposed radially inwardly of the retaining cylinder 36.

The first member 45 of the carrier 22 is formed with a support-shaft supporting hole 52 at a place radially outwardly of the through-hole 48. The support-shaft supporting holes 52 are provided corresponding to the number of the planet gears 21 (two, for example). A periphery of each support-shaft supporting hole 52 rotatably supports each corresponding one support shaft 21b, 21b via each corresponding sixth bearing 53. The sixth bearing 53 comprises a roller bearing, for example.

Figure 5:
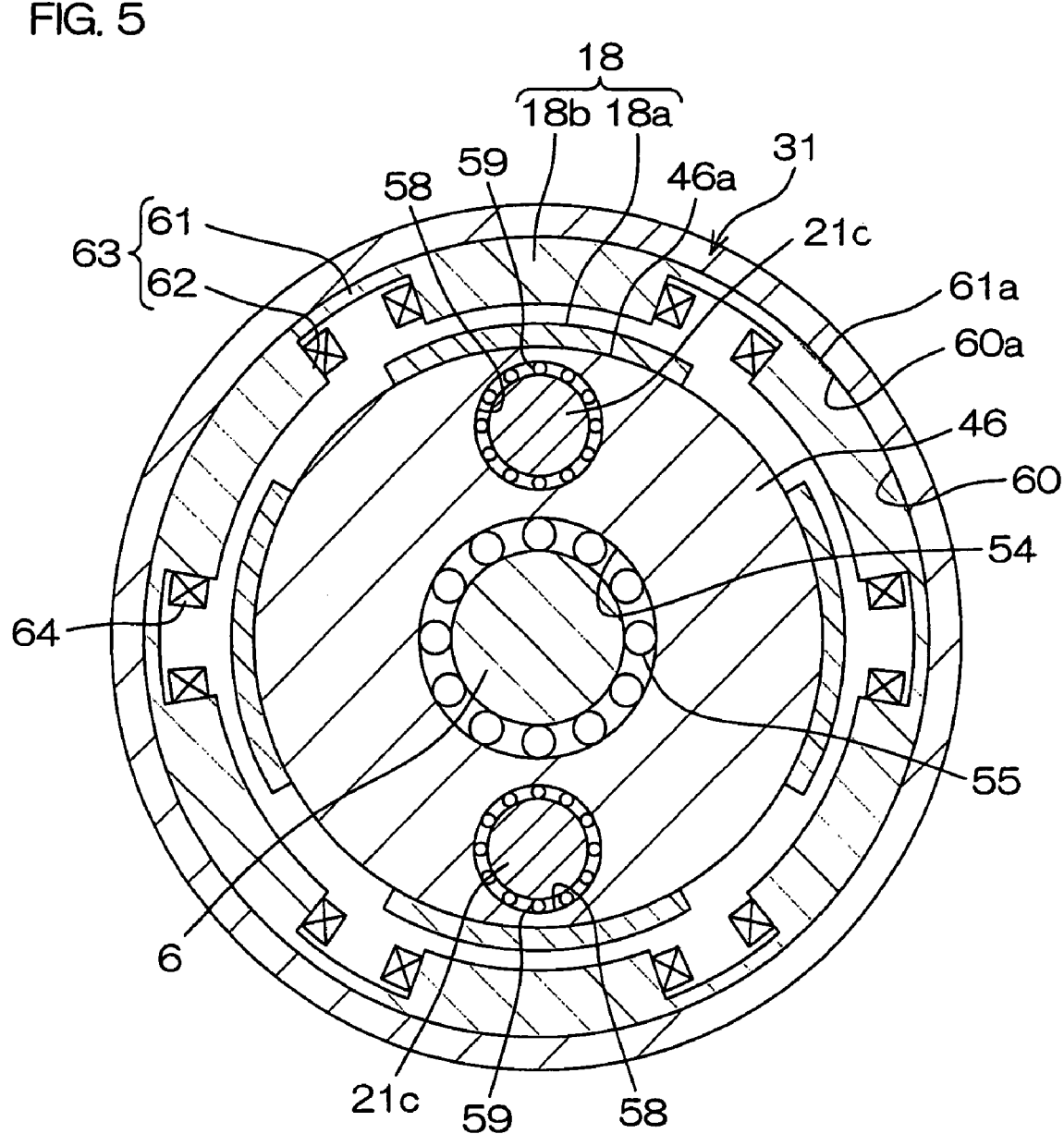
FIG. 5 is a sectional view taken on the line V-V in FIG. 2.

FIG. 5 is a sectional view taken on the line V-V in FIG. 2. Referring to FIG. 2 and FIG. 5, the second member 46 of the carrier 22 comprises a through-hole 54 through which the second shaft 6 is inserted. A periphery of the through-hole 54 rotatably supports an outer periphery of the second shaft 6 via a seventh bearing 55 comprising a rolling bearing such as a roller bearing.

The second member 46 of the carrier 22 is formed with an annular flange 56. The flange 56 is rotatably supported by a support hole 34e of the housing 31 via an eighth bearing 57 comprising a single-row angular contact ball bearing or the like. The eighth bearing 57 has an inner ring 57a fitted about the flange 56 and has an outer ring 57b fitted in the support hole 34e of the housing 31.

The second member 46 of the carrier 22 is formed with a support-shaft supporting hole 58 at a place radially outwardly of the through-hole 54. The support-shaft supporting holes 58 are provided corresponding to the number of the planet gears 21 (two, for example). A periphery of each support-shaft supporting hole 58 rotatably supports each corresponding other support shaft 21c, 21c via each corresponding ninth bearing 59. The ninth bearing 59 comprises a roller bearing, for example.

The rotor 18a of the planet-gear-mechanism motor 18 is fixed to an outer periphery 46a of the second member 46 of the carrier 22. The rotor 18a has a plurality of permanent magnets arranged in a circumferential direction thereof. Each of the permanent magnets is magnetized in a direction connecting the inside circumference and the outside circumference of the rotor. Adjacent magnets are magnetized in the opposite polarities to each other.

The stator 18b of the planet-gear-mechanism motor 18 is accommodated by a second groove 60 of the housing 31. That is, the housing 31 also serves as the housing of the planet-gear-mechanism motor 18. The stator 18b of the planet-gear-mechanism motor 18 comprises a stator core 63 including an annular base 61 and a plurality (for example, six) of teeth 62 projecting inwardly from the base 61, and electromagnetic coils 64 wound about the respective teeth 62. The base 61 has an outer periphery 61a fixed to an annular periphery 60a of the second groove 60 of the housing 31 by way of shrinkage fit or the like.

Referring to FIG. 2, the aforesaid second and third bearings 35, 44 as the ball bearings are each applied with a preload. Specifically, a first resilient biasing member 66 such as a belleville spring is interposed between the outer ring 44b of the third bearing 44 and an annular step 65 at one end of the housing 31. The first biasing member 66 biases the outer ring 44b of the third bearing 44 toward the second bearing The inner ring 44a of the third bearing 44 is received by a snap ring 67 fitted in a groove of the second shaft 6, whereby the third bearing is prevented from moving toward the second bearing 35. A friction member 68 is interposed between the second shaft 6 and the output shaft 5b of the first shaft 5 (between the first sun gear 19 and the second sun gear 20). The friction member 68 is a disk-like member formed from a resin, for example. The friction member 68 is retained by the first and second shafts 5, 6.

The inner ring 35a of the second bearing 35 is received by an annular groove 69 of the output shaft 5b of the first shaft 5, whereby the second bearing 35 is prevented from moving toward the third bearing 44. The outer ring 35b of the second bearing 35 is received by an annular step 70 of the housing 31, where by the second bearing is prevented from moving away from the third bearing 44 with respect to the axial direction S.

According to the above arrangement, the biasing force from the first biasing member 66 is transmitted to the second bearing 35 via the third bearing 44, the snap ring 67, the second shaft 6, the friction member 68 and the output shaft 5b of the first shaft 5 and is received by the step 70 of the housing 31.

The aforesaid fifth and eighth bearings 51, 57 as the ball bearings are each applied with a preload. Specifically, a second resilient biasing member 72 such as a belleville spring is interposed between the outer ring 57b of the eighth bearing 57 and an annular step 71 at one end of the housing 31. The second biasing member 72 biases the outer ring 57b of the eighth bearing 57 toward the fifth bearing 51.

The inner ring 57a of the eighth bearing 57 is received by an annular step 73 formed on the second member 46 of the carrier 22, whereby the eighth bearing 57 is prevented from moving toward the fifth bearing 51. The fifth bearing 51 has an inner ring 51a press-fitted in an outer periphery of the flange 50 of the first member 45 of the carrier 22. The fifth bearing 51 has an outer ring 51b received by a snap ring 74 fitted in an annular groove of the housing 31, whereby the fifth bearing 51 is prevented from moving away from the eighth bearing 57 with respect to the axial direction S.

According to the above arrangement, the biasing force of the second biasing member 72 is transmitted to the fifth bearing 51 via the eighth bearing 57, the second member 46 of the carrier 22, the coupling portion 47 and the first member 45, and is received by the housing 31 via the snap ring 74.

One of the features of the present embodiment is that (i) the two planet gears 21 are provided, that (ii) the toothed portion 21a of each of the planet gears 21, 21 is integrally formed by using a single member respectively, that (iii) at least one of the first and second sun gears 19, 20 (the first sun gear 19 according to the present embodiment) is constituted by a profile shifted gear whereby the first and second sun gears 19, 20 have mutually different profile shift coefficients $x_1$, $x_2$, and that (iv) a difference between teeth numbers $z_1$, $z_2$ of the first and second sun gears 19, 20 is two.

The toothed portion 21a of each planet gear 21 has the same sectional shape across an overall area thereof with respect to the axial direction S of the steering shaft 3, and the axial direction defines a tooth trace direction of the toothed portion 21a. Each planet gear 21 is formed by a single tooth cutting step.

In the planet gear 21, a teeth number $z_3$ of the toothed portion 21a as a portion meshed with the first sun gear 19 is equal to a teeth number $z_3$ of the toothed portion 21a as a portion meshed with the second sun gear 20. That is, a teeth number $z_3$ of the planet gear 21 meshed with the first sun gear 19 is equal to a teeth number $z_3$ of the planet gear 21 meshed with the second sun gear 20.

Figure 6A:
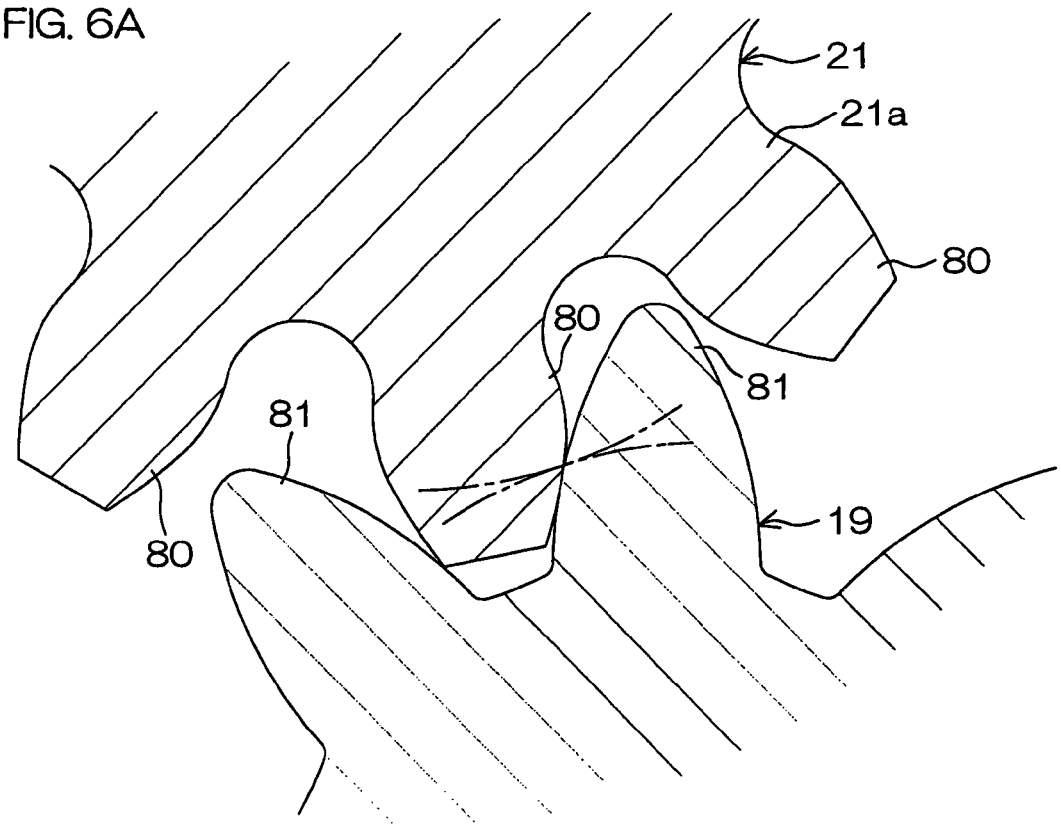
FIG. 6A is a sectional view taken on the line VIA-VIA in FIG. 2 for showing a meshing relation between a planet gear and a first sun gear.
Figure 6B:
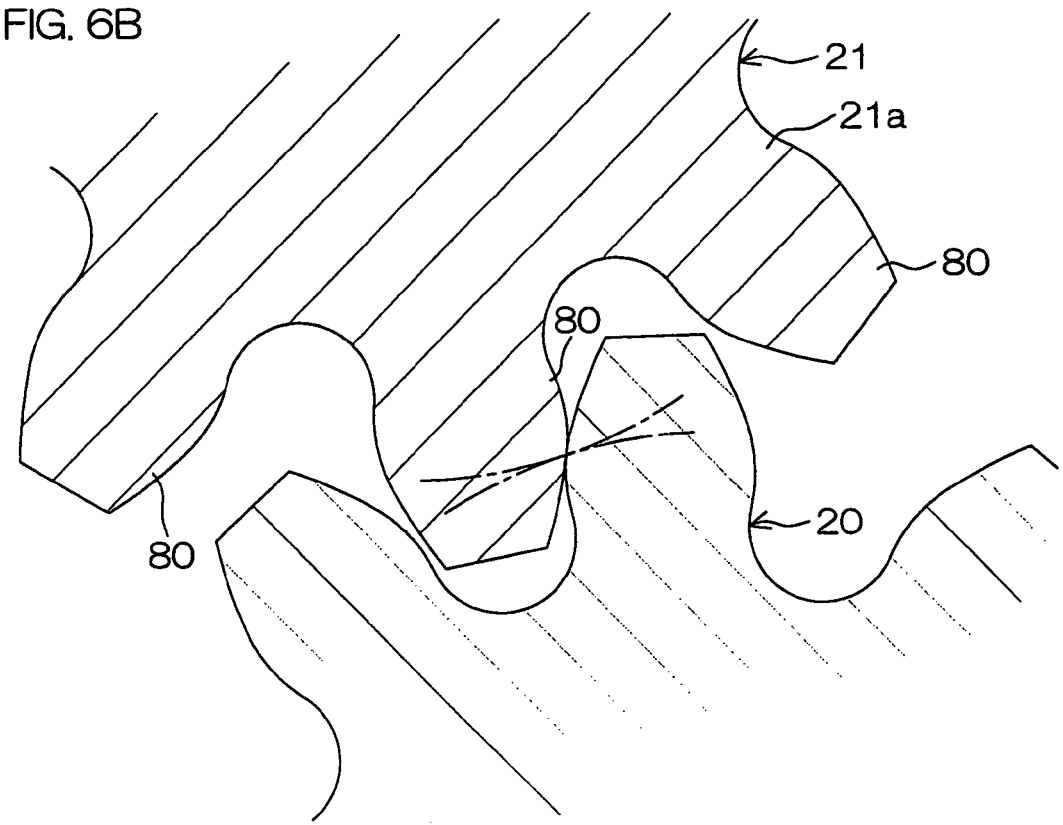
FIG. 6B is a sectional view taken on the line VIB-VIB in FIG. 2 for showing a meshing relation between the planet gear and a second sun gear.

FIG. 6A is a sectional view taken on the line VIA-VIA in FIG. 2 for showing a meshing relation between the planet gear 21 and the first sun gear 19. FIG. 6B is a sectional view taken on the line VIB-VIB in FIG. 2 for showing a meshing relation between the planet gear 21 and the second sun gear 20.

Referring to FIG. 6A and FIG. 6B, the toothed portion 21$a$ of each planet gear 21 includes a plurality of tooth portions 80.

According to the present embodiment, only the first sun gear 19 of the first and second sun gears 19, 20 is constituted as the profile shifted gear. For instance, the first sun gear 19 has the teeth number z1 of 22 and the profile shift coefficient x1 of 1.251, whereas the second sun gear 20 has the teeth number z2 of 24 and the profile shift coefficient x2 of 0.

Namely, the first sun gear 19 is a positive shifted gear and has a profile shifted in a direction in which the diameter of a pitch circle increases. The second sun gear 20 is a standard gear. Each planet gear 21 is a standard gear having, for example, a teeth number z3 of 17 and a profile shift coefficient x3 of 0.

As to the first and second sun gears 19, 20, the second sun gear 20 having the relatively greater teeth number has the relatively smaller profile shift coefficient x2, whereas the first sun gear 19 having the relatively smaller teeth number has the relatively greater profile shift coefficient x1 (x2<x1).

The teeth numbers z1, z2, z3 of the above first and second sun gears 19, 20 and of the planet gear 21 are preferably in the range of 10 to 30, respectively.

If each of the above teeth numbers z1, z2, z3 is less than 10, a meshing impact between the planet gear 21 and the corresponding first or second sun gear 19, 20 is increased, whereby increased noises result.

If each of the teeth numbers z1, z2 is more than 30, a speed ratio between the carrier 22 and the second sun gear 20 is excessively increased. If the first sun gear 19 has a teeth number z1 of 31 and the second sun gear 20 has a teeth number z2 of 33, a speed ratio between the carrier 22 and the second sun gear 20 is $1-(z1/z2)=1-(31/33)\approx 0.0606\approx 1/16.5$. Thus, the speed ratio is excessively increased, so that meshing engagement between the planet gear 21 and the second sun gear 20 or the like produces greater noises.

In a case where each of the above teeth numbers z1, z2, z3 is the range of 10 to 30, an absolute value of a difference between the profile shift coefficients x1, x2 of the first and second sun gears 19, 20 is around 1.0 to around 1.3.

Each of the profile shift coefficients x1, x2 of the first and second sun gears 19, 20 preferably has an absolute value of 1.3 or less. If the positive shifted first sun gear 19 has a profile shift coefficient in excess of 1.3, a tooth portion 81 of the first sun gear is excessively decreased in tooth height.

The present embodiment may offer the following working effects. That is, both the planet-gear-mechanism motor 18 and the reaction-force compensation motor 23 can be disposed in a manner to surround the steering shaft 3. This eliminates the need for locating the above motors 18, 23 in opposed relation to each other with the steering shaft 3 interposed therebetween. This results in the reduction of space occupied by these motors 18, 23 with respect to the radial direction R of the steering shaft 3. Thus the size reduction of the steering apparatus for vehicle 1 is achieved.

The use of the planet gear mechanism 17 permits the torque from the steering member 2 to be transmitted to the steerable wheels 4L, 4R via the first sun gear 19, the planet gears 21, the second sun gear 20 and the like. Furthermore, the reaction force from the steerable wheels 4L, 4R can be transmitted to the steering member 2 via the second sun gear 20, the planet gears 21, the first sun gear 19 and the like.

In addition, the carrier 22 is driven into rotation by means of the planet-gear-mechanism motor 18. The transmission ratio θ2/θ1 can be varied by varying the rotational speed of the carrier 22.

The housing 31 accommodating the planet gear mechanism 17 also serves as the housing of the planet-gear-mechanism motor 18. This eliminates the need for providing an additional housing for the planet-gear-mechanism motor 18, so that the steering apparatus for vehicle 1 can be further reduced in size.

Further, the above housing 31 also serves as the housing of the reaction-force compensation motor 23. This eliminates the need for providing an additional housing for the reaction-force compensation motor 23, so that the steering apparatus for vehicle 1 can be even further reduced in size.

The carrier 22 is so designed as not to project outwardly of the planet gear 21 with respect to the radial direction R of the steering shaft 3. Thus a space occupied by the planet gear mechanism 17 is reduced with respect to the radial direction R. Since a ring-like internal gear surrounding the planet gear is not used, the steering apparatus for vehicle 1 can be even further reduced in size.

In addition, the output of the reaction-force compensation motor 23 is directly transmitted to the output shaft 5$b$ of the first shaft 5 without using reduction gears. This is based on a finding that the reaction force compensation does not require so much torque, and hence, it is unnecessary to decelerate the output from the reaction-force compensation motor 23. Thus torque variations, noise production and the size increase of the system as a result of the case where the reduction gears are provided can be avoided. Further, since inertia and frictional resistance are reduced, control delay related to the reaction force compensation can be suppressed.

The second and fifth bearings 35, 51 are disposed at places radially inwardly of the retaining cylinder 36 retaining the rotor 23$a$ of the reaction-force compensation motor 23, whereby the steering apparatus for vehicle 1 can be decreased in the overall length thereof with respect to the axial direction S to be further reduced in size.

The toothed portion 21$a$ of each planet gear 21 is integrally formed by using a single member, thereby reducing the labor involved in forming the planet gear 21. In a case where a gear member meshed with the first sun gear and a gear member meshed with the second sun gear are separately formed, for example, these gear members must be exactly positioned and welded to each other. However, the present embodiment does not require such tasks. As a result, the number of parts and the number of manufacture steps can be reduced and the manufacture costs can be remarkably reduced.

Further, the planet gear 21 can be reduced in size because the planet gear does not require an arrangement for welding the above two gear members. Further, the assembling of the planet gear 21 does not require the respective phases of the two gear members to be matched with the phases of the corresponding first and second sun gears. This leads to the reduction of labor involved in the manufacture.

Further, the first and second sun gears 19, 20 respectively having the different teeth numbers z1, z2 have the profile shift coefficients x1, x2 differing from each other. Hence, an axis-to-axis distance between the planet gear 21 and the first sun gear 19 can be made equal to an axis-to-axis distance between the planet gear 21 and the second sun gear 20. Thus a smooth meshing engagement is accomplished.

Further, the use of two planet gears 21 can be permitted by defining the difference between the teeth numbers of the first and second sun gears 19, 20 to be two. Thus, the power transmitted by the respective planet gears 21 can be distributed equally. This leads to the reduction of meshing noises produced by the respective gears 19, 20, 21 of the planet gear mechanism 17, and also to the optimization of the respective profile shift coefficients x1, x2 of the first and second sun gears 19, 20. Accordingly, the first and second sun gears 19, 20 can have sufficient strengths.

If only one planet gear is used, load on the planet gear is so great that meshing noises is increased. If three or more planet gears are used, the difference of the teeth numbers between the first and second sun gears must be three or more. In this case, at least one of the profile shift coefficients of the first and second sun gears must be increased. Accordingly, if a positive shifted sun gear (having a profile shift coefficient of 1.5, for example) is used, the gear fails to have a sufficient tooth height. If a negative shifted sun gear (having a profile shift coefficient of −1.5, for example) is used, the gear fails to have a sufficient thickness at dedendum.

Since the planet gear mechanism 17 employs the first and second sun gears 19, 20, the first and second sun gears 19, 20 can be reduced in size with respect to the radial direction. Thus, the planet gear mechanism 17 can achieve size reduction.

Further, the teeth numbers z1, z2, z3 of the first and second sun gears 19, 20 and the planet gear 21 are each defined to be 10 or more. Thus, the meshing impact between the planet gear 21 and the first or second sun gear 19, 20 can be decreased to reduce noises. Further, the above teeth numbers z1, z2 are each defined to be 30 or less, thereby preventing the speed ratio between the carrier 22 and the second sun gear 20 from being increased excessively. As a result, the rotational speed of the carrier 22 can be reduced at the time of varying the transmission ratio $\theta 2/\theta 1$ by driving the carrier 22 into rotation by the planet-gear-mechanism motor 18. Hence, the meshing noises produced by the planet gear 21 and the second sun gear 20 can be reduced.

Further, the absolute value of the profile shift coefficient x1 of the first sun gear 19 is defined to be 1.3 or less. This not only prevents the positive shifted sun gear 19 from being excessively decreased in tooth height, but also provides a sufficient thickness at tooth top.

As to the first and second sun gears 19, 20, the second sun gear 20 having the relatively greater teeth number has the relatively smaller profile shift coefficient x2, whereas the first sun gear 19 having the relatively smaller teeth number has the relatively greater profile shift coefficient x1 (x2<x1). This leads to the reduction of backlash between the first and second sun gears 19, 20 and the planet gears 21.

The present invention is not limited to the contents of the foregoing embodiments and various changes and modifications can be made thereto without departing from the scope of the invention.

Figure 7A:
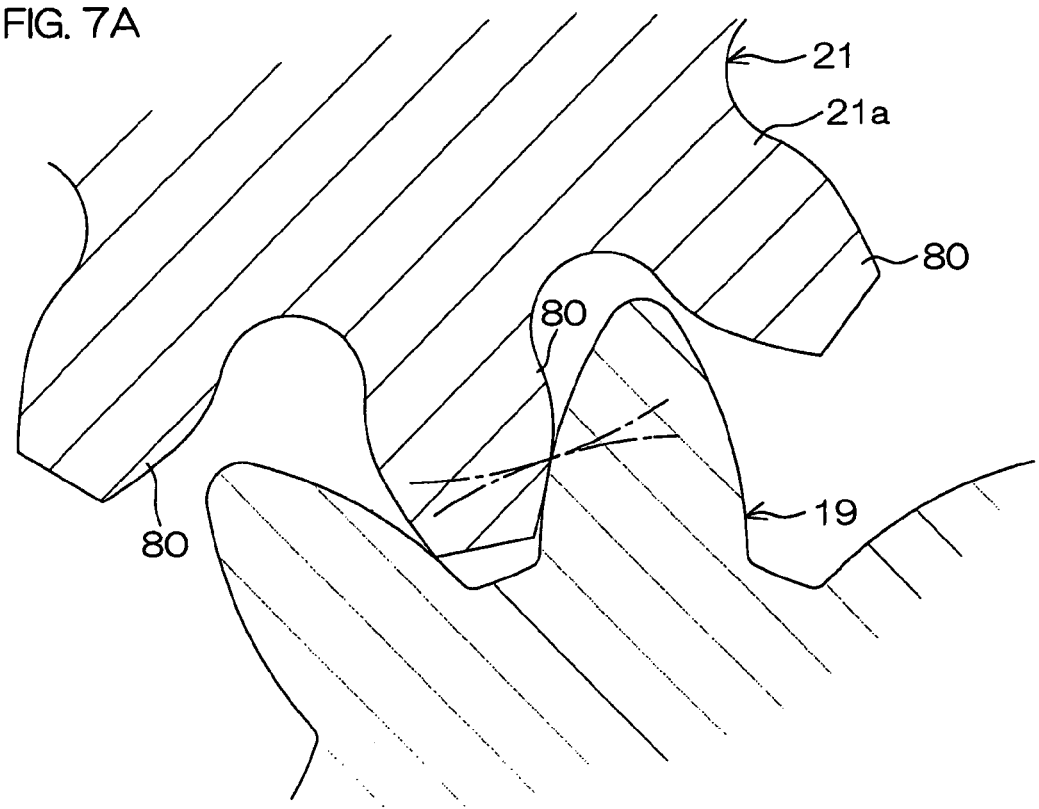
FIG. 7A and FIG. 7B are sectional views showing a principal part of another embodiment of the present invention.
Figure 7B:
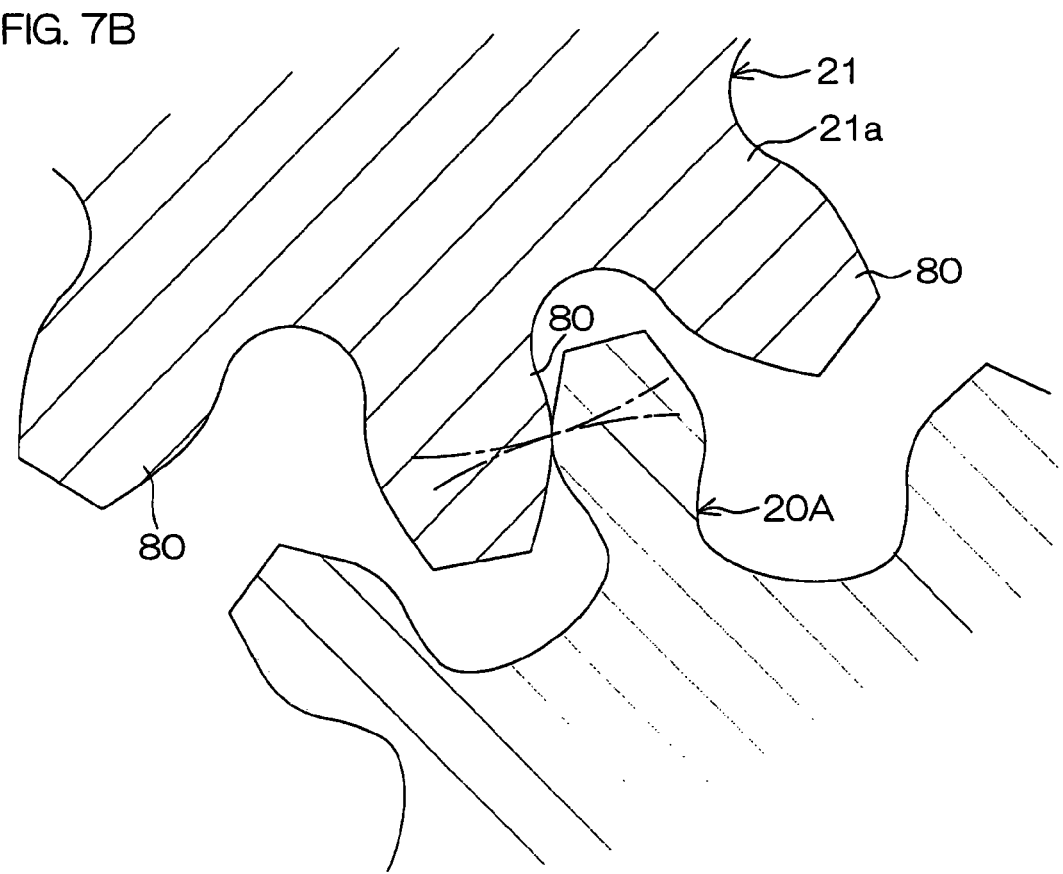

As shown in FIG. 7A and FIG. 7B, for example, a second sun gear 20A comprising a negative shifted gear may be used instead of the second sun gear 20 comprising the standard gear. The negative shifted gear has a profile shifted in a direction in which the diameter of the pitch circle decreases. The profile shift coefficient of the negative shifted gear is smaller than those of the standard gear and the positive shifted gear. In the negative shifted gear, "the profile shift coefficient increases" as the absolute value of the profile shift coefficient decreases.

The absolute value of a profile shift coefficient x2A of the second sun gear 20A is preferably 1.3 or less. If the absolute value of the profile shift coefficient x2A exceeds 1.3, the second sun gear 20A, which is negatively shifted, may fail to have a sufficient thickness at dedendum. The above profile shift coefficient x2A is defined as −0.2, for example, whereas the profile shift coefficient x1 of the first sun gear 19 is defined as 1.0, for example.

The absolute value of the profile shift coefficient x2A of the second sun gear 20A is set to 1.3 or less as described above, whereby the second sun gear 20A comprising the negative shifted gear can be prevented from being excessively decreased in thickness at dedendum. The first sun gear 19 may comprise a standard gear having a profile shift coefficient x1 of zero.

Figure 8A:
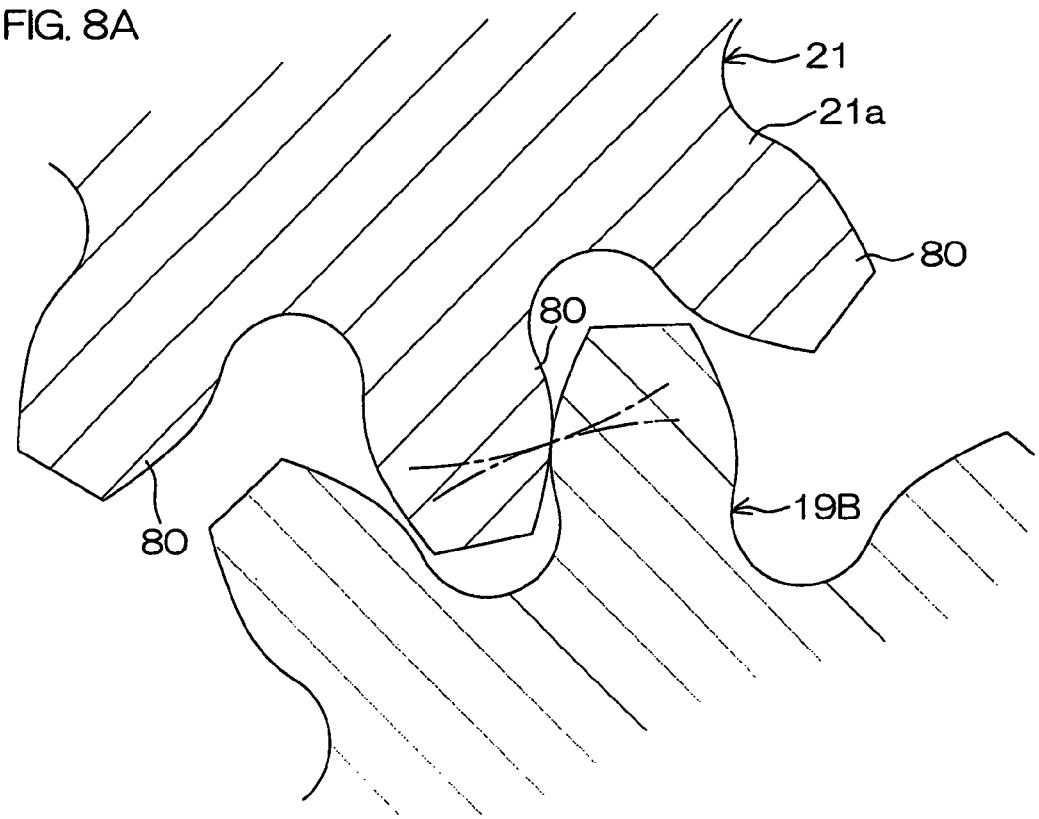
FIG. 8A and FIG. 8B are sectional views showing a principal part of still another embodiment of the present invention.
Figure 8B:
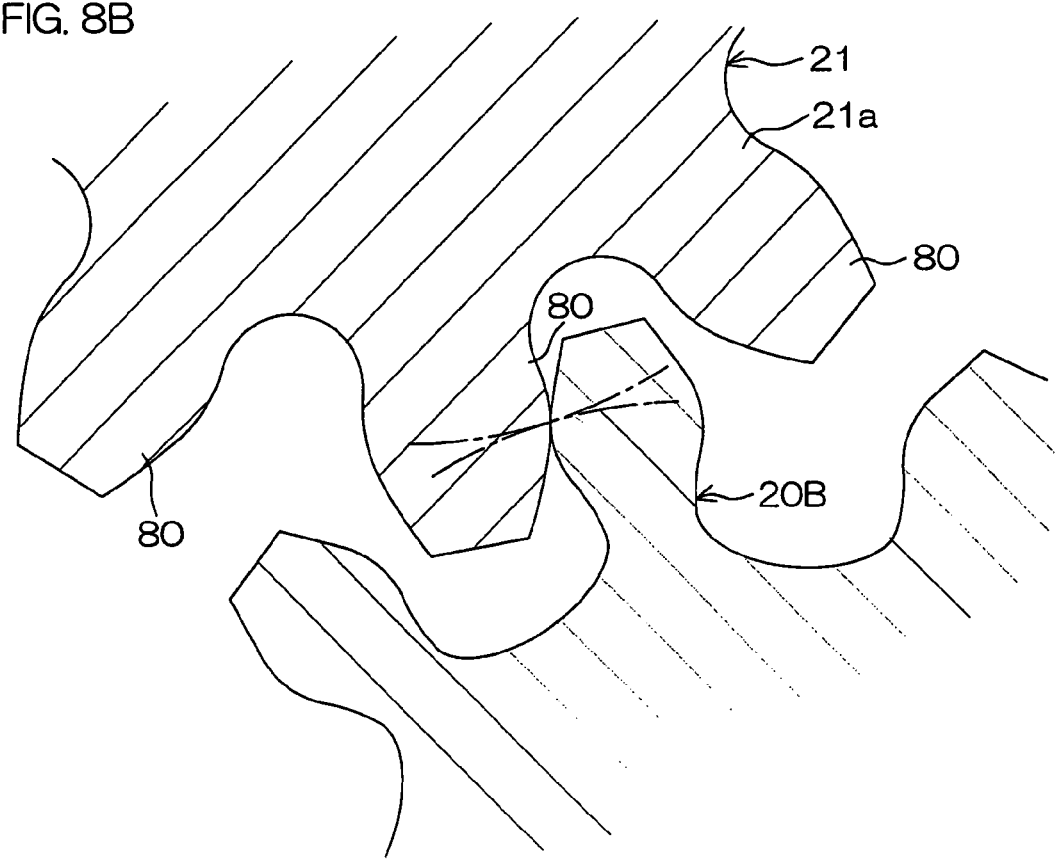

As shown in FIG. 8A and FIG. 8B, it is also possible to use both a first sun gear 19B comprising a standard gear and a second sun gear 20B comprising a negative shifted gear.

Figure 9A:
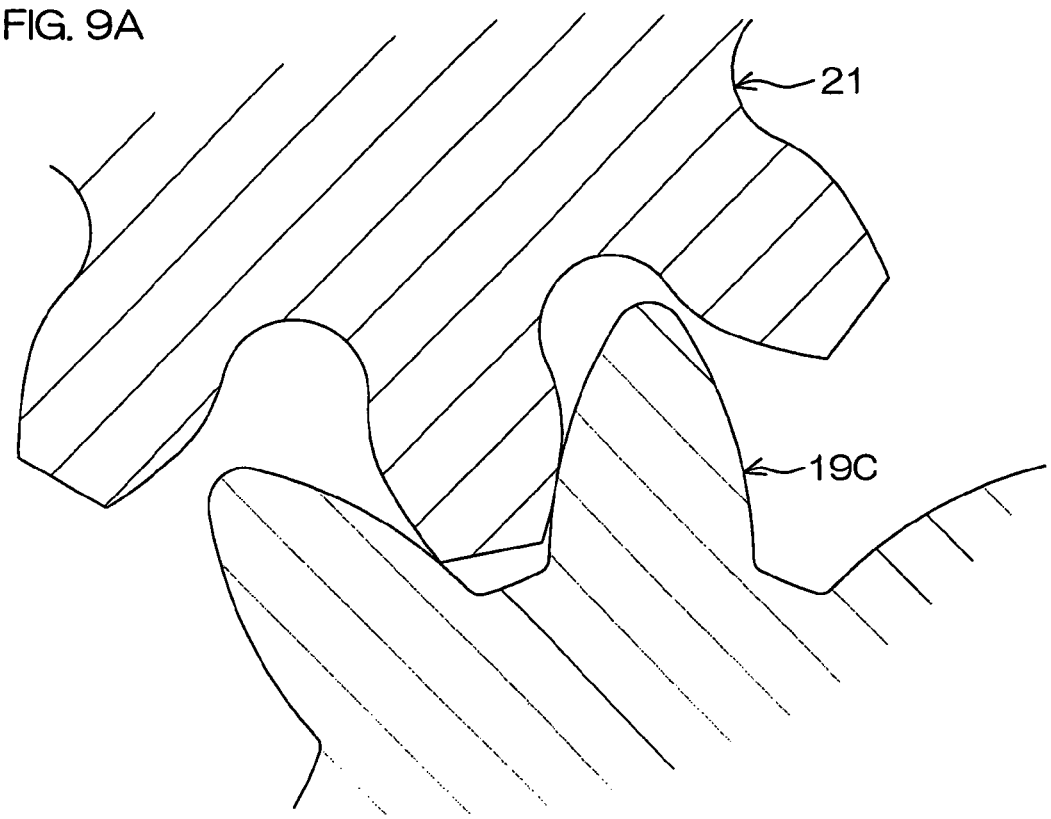
FIG. 9A and FIG. 9B are sectional views showing a principal part of still another embodiment of the present invention.
Figure 9B:
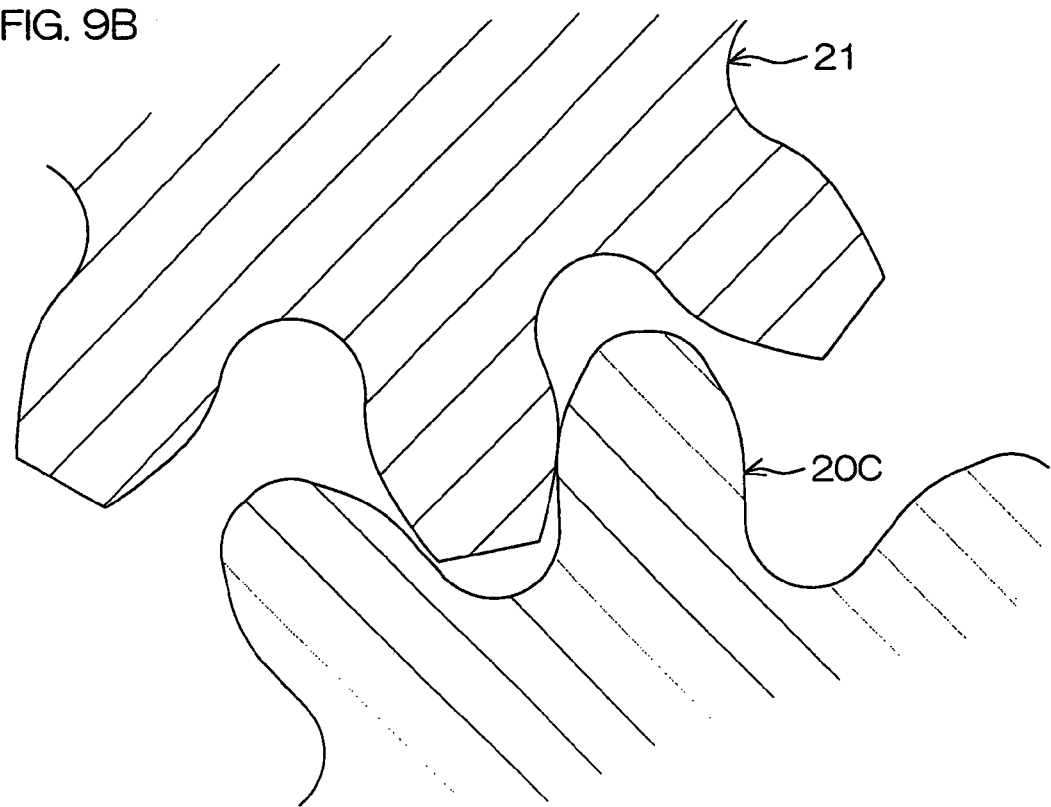

Alternatively, it is also possible to use first and second sun gears 19C, 20C both comprising positive shifted gears, as shown in FIG. 9A and FIG. 9B.

Figure 10A:
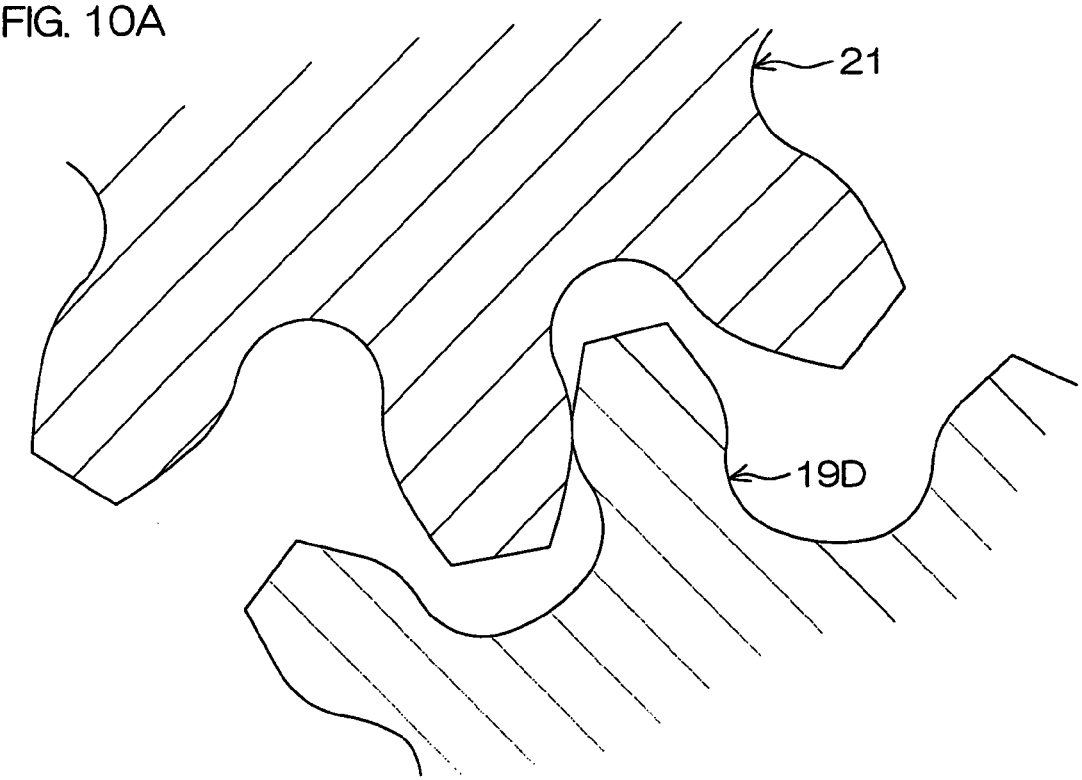
FIG. 10A and FIG. 10B are sectional views showing a principal part of still another embodiment of the present invention.
Figure 10B:
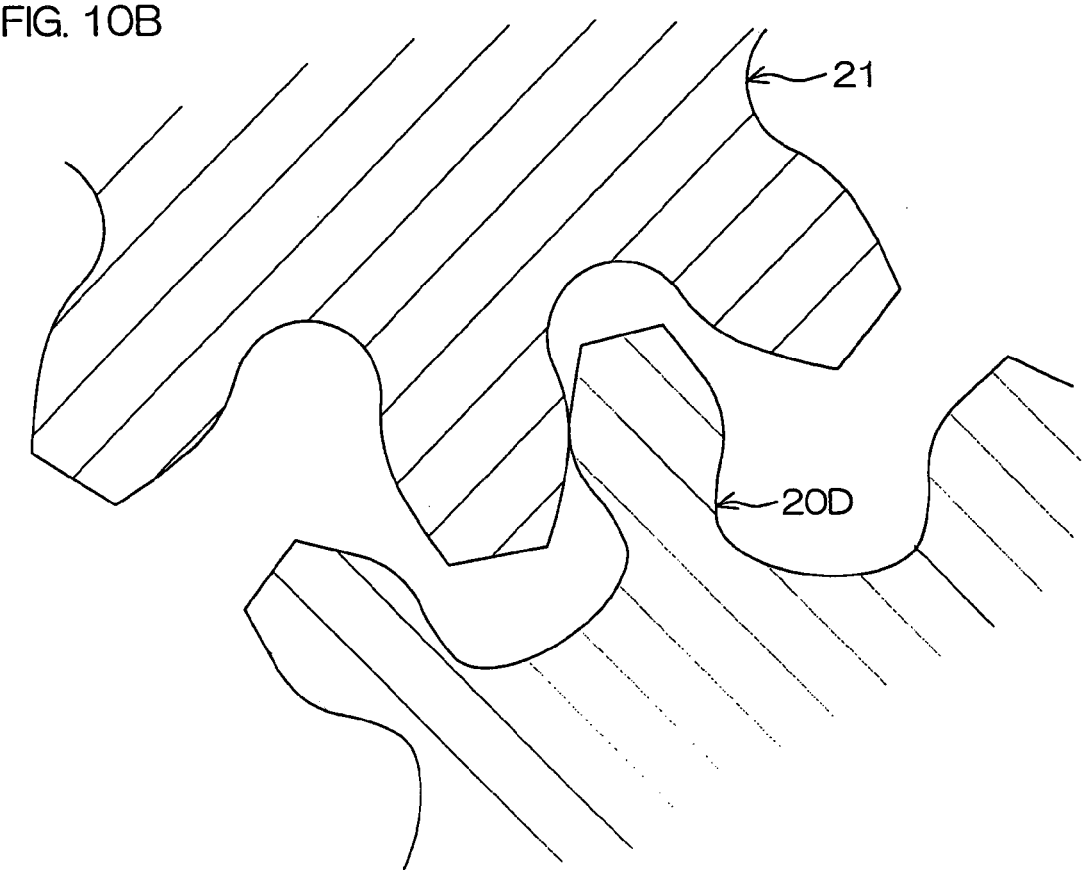

Alternatively, it is also possible to use first and second sun gears 19D, 20D each comprising a negative shifted gear, as shown in FIG. 10A and FIG. 10B.

Figure 11:
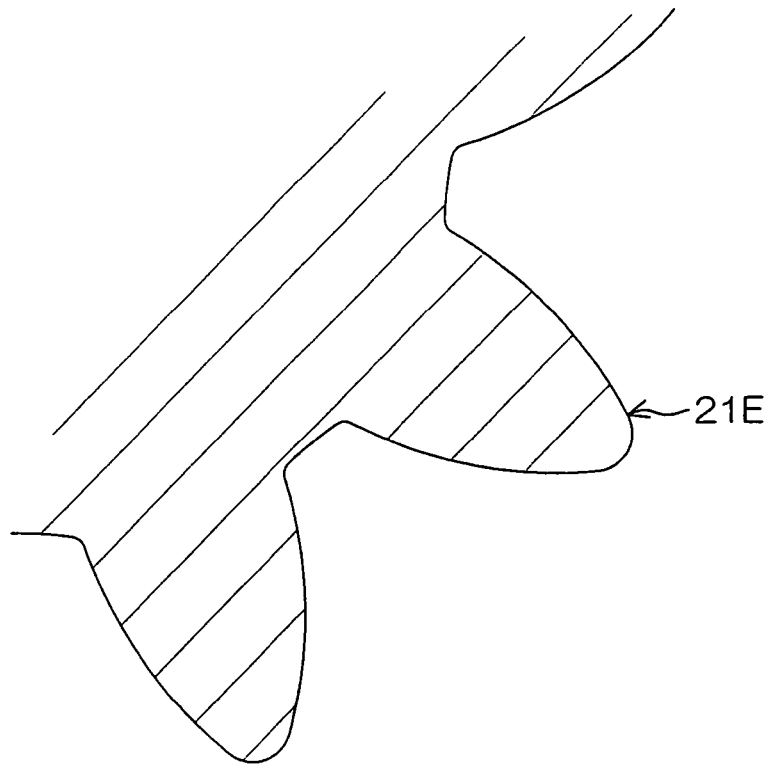
FIG. 11 is a sectional view showing a principal part of still another embodiment of the present invention.
Figure 12:
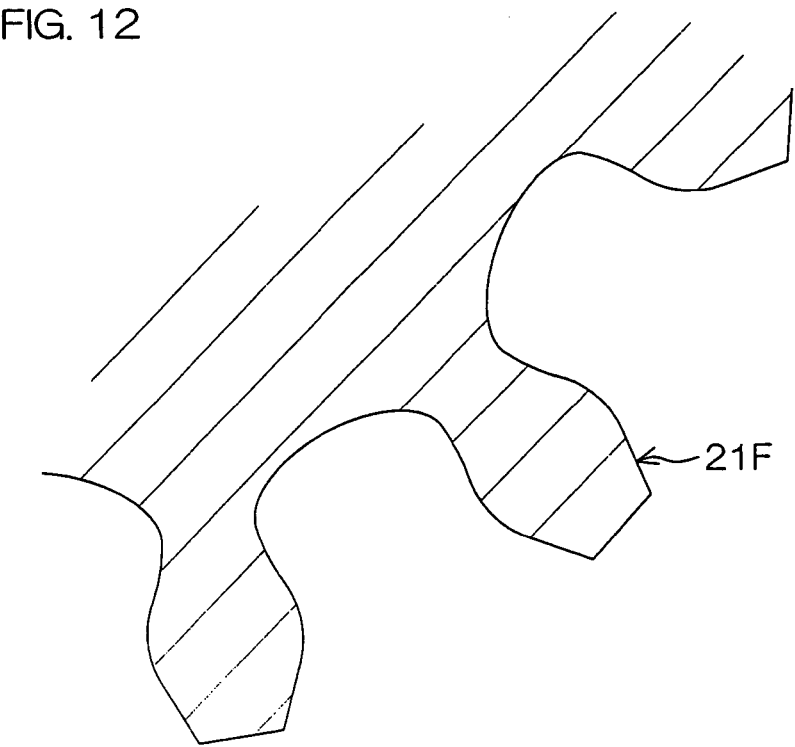
FIG. 12 is a sectional view showing a principal part of still another embodiment of the present invention.

Further, a planet gear 21E comprising a positive shifted gear may also be used, as shown in FIG. 11. Alternatively, a planet gear 21F comprising a negative shifted gear may also be used, as shown in FIG. 12.

In the foregoing embodiments, the locations of the first and second gears may be inverted such that the first sun gear have the greater teeth number than that of the second sun gear. What is important is that one of the first and second sun gears, that has the greater teeth number, has the smaller profile shift coefficient.

The first and second sun gears maybe replaced by first and second gears each comprising a circular internal gear.

The planet-gear-mechanism motor 18 may comprise a brush motor. The reaction-force compensation motor 23 may comprise a brush motor.

Figure 13:
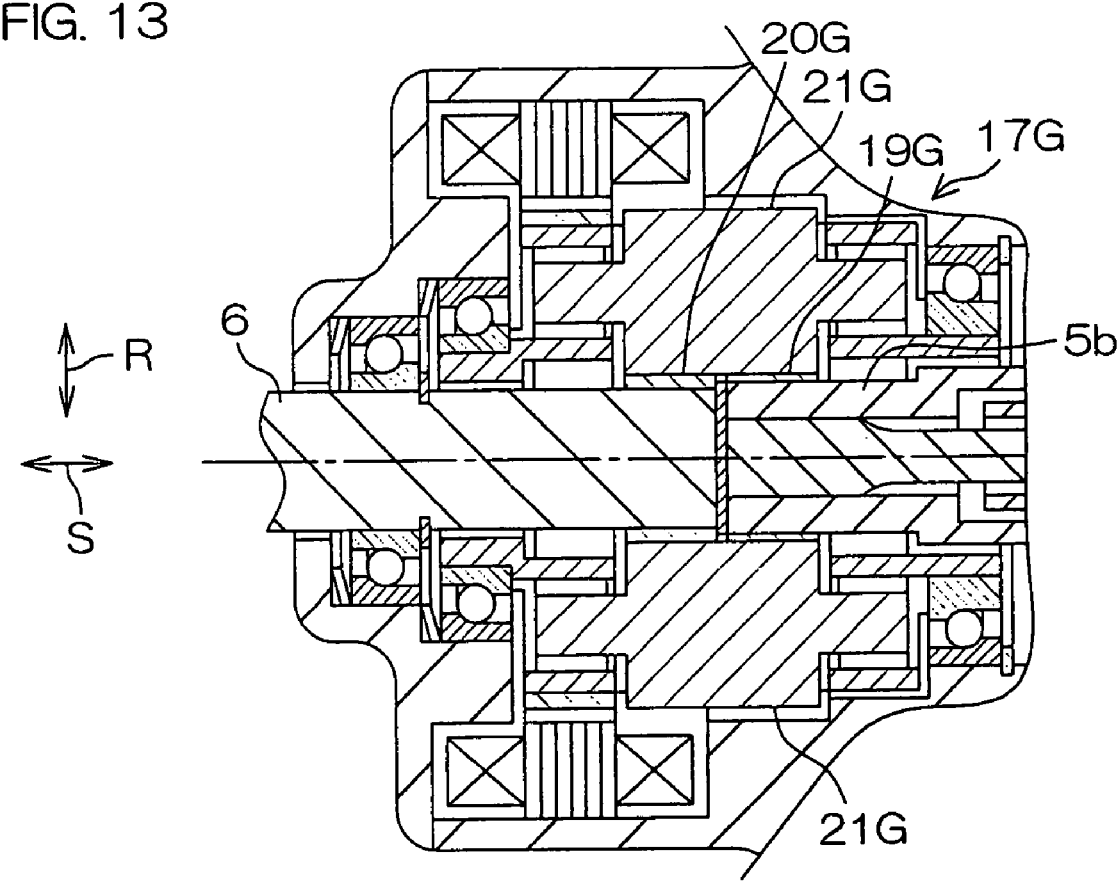
FIG. 13 is a sectional view showing a principal part of still another embodiment of the present invention.

The planet gear mechanism 17 may be replaced by a traction drive mechanism 17G as shown in FIG. 13. The traction drive mechanism 17G comprises a first roller 19G, a second roller 20G and a planet roller 21G. In the traction drive mechanism 17G, the planet rollers 21G and corresponding the first and second rollers 19G, 20G are engaged with each other via a thin lubricant film for torque transmission.

Figure 14:
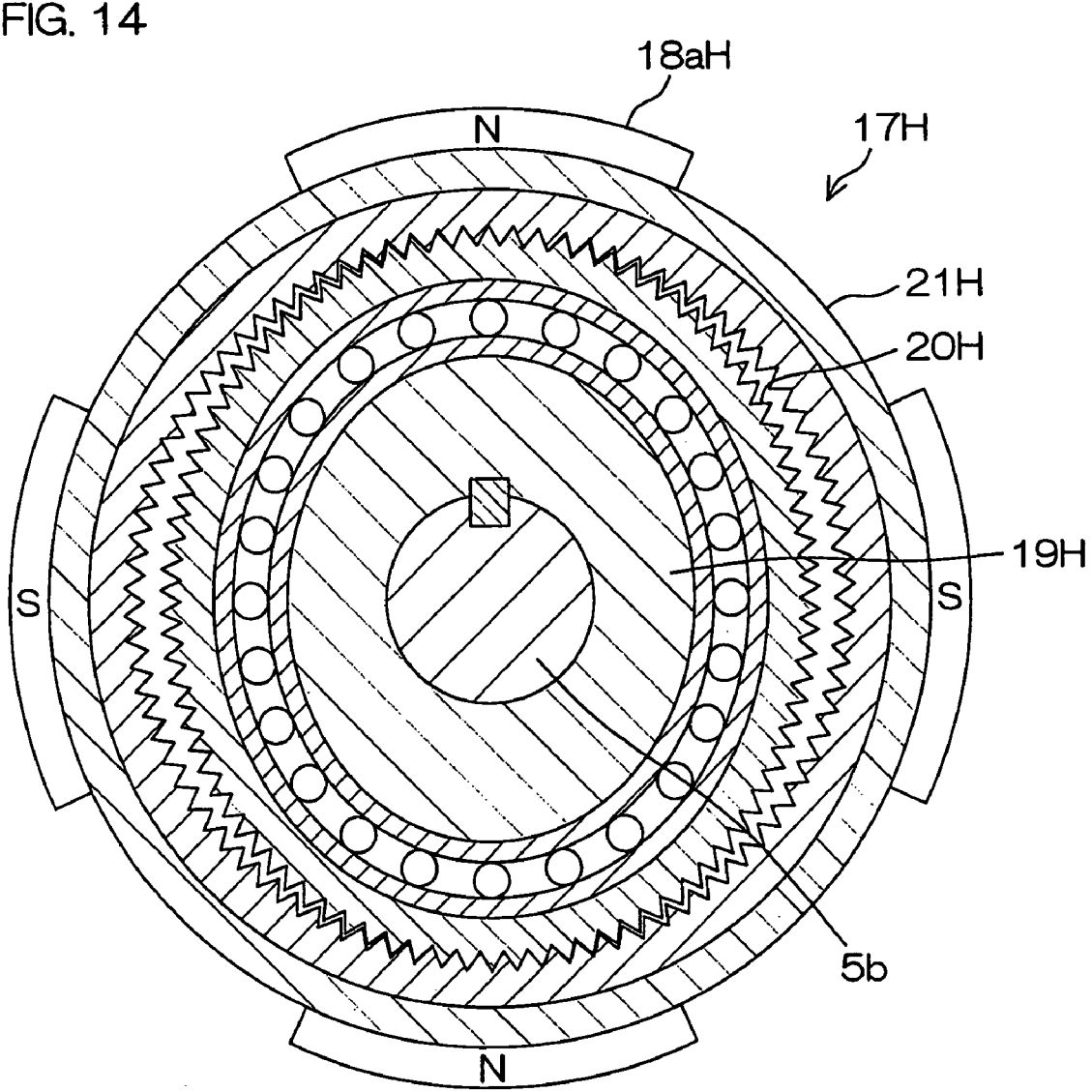
FIG. 14 is a sectional view showing a principal part of still another embodiment of the present invention.

A wave-motion drive gearing mechanism 17H shown in FIG. 14 may also be used as the differential mechanism. The wave-motion drive gearing mechanism 17H comprises a rigid circular spline 21H, a flexible spline 20H disposed at a place inwardly of the rigid circular spline 21H, and a wave generator 19H bending the flexible spline 20H in an oval shape to bring the flexible spline 20H into meshing engagement with the rigid circular spline 21H.

The wave generator 19H is provided as a first element and is connected with the output shaft 5b of the first shaft 5 so that they can rotate together. The flexible spline 20H is provided as a second element and is connected with the second shaft so that they can rotate together. A rotor 18aH of an electric motor as the differential-gear-mechanism motor is fixed to an outer periphery of the rigid circular spline 21H.

While the invention has been described in details with reference to the specific embodiments thereof, it is to be understood that changes, modifications and equivalents thereof will occur to those skilled in the art who have understood the above contents. The scope of the invention, therefore, is defined by the appended claims and their equivalents.

The present application corresponds to Japanese Patent Application No. 2006-135319 filed with Japanese Patent Office on May 15, 2006 and Japanese Patent Application No.

2006-259444 filed with Japanese Patent Office on Sep. 25, 2006, and the whole disclosures thereof are incorporated herein by reference.

What is claimed is:

1. A steering apparatus for vehicle comprising:
   a steering shaft including a first portion connected to a steering member and a second portion connected to steerable wheels,
   a transmission ratio variable mechanism capable of varying a transmission ratio as a ratio of a steered angle of the steerable wheels to a steering angle of the steering member, and
   a reaction-force compensation motor for compensating a steering reaction force of the steering member caused by an operation of the transmission ratio variable mechanism,
   wherein the transmission ratio variable mechanism includes a differential mechanism for differentially rotatably interconnecting the first and second portions, and a differential-mechanism motor for driving the differential mechanism, and
   both an axis of a rotary shaft of the differential-mechanism motor and an axis of a rotary shaft of the reaction-force compensation motor are coaxial with an axis of the steering shaft.

2. A steering apparatus for vehicle according to claim 1,
   wherein the differential mechanism includes a planet transmission mechanism, and
   the planet transmission mechanism includes a first element connected to the first portion, a second element connected to the second portion, and a third element interconnecting the first and second elements.

3. A steering apparatus for vehicle according to claim 2,
   wherein the planet transmission mechanism includes a planet gear mechanism comprising a first gear as the first element, a second gear as the second element, a planet gear as the third element, and a carrier for the planet gear,
   an axis of the first gear is aligned with an axis of the second gear,
   the planet gear is meshed with both the first gear and the second gear, and the carrier supports the planet gear rotatably about an axis of the planet gear, and is rotatably supported about the axis of the first gear.

4. A steering apparatus for vehicle according to claim 3,
   wherein the carrier is driven into rotation by the differential-mechanism motor.

5. A steering apparatus for vehicle according to claim 4,
   wherein the differential-mechanism motor varies a rotational speed of the carrier, thereby varying the transmission ratio.

6. A steering apparatus for vehicle according to claim 4, further comprising a housing for accommodating the planet gear mechanism,
   wherein the differential-mechanism motor comprises a rotor rotatable together with the carrier, and a stator surrounding the rotor and accommodated in the housing.

7. A steering apparatus for vehicle according to claim 1,
   wherein the first portion includes an input member to which a steering torque is inputted from the steering member, and an output member relatively rotatably connected with the input member via a torsion bar spring and outputting the steering torque to the differential mechanism.

8. A steering apparatus for vehicle according to claim 7, further comprising a housing for accommodating the differential mechanism,
   wherein the reaction-force compensation motor comprises a rotor rotatable together with the output member of the first portion of the steering shaft, and a stator surrounding the rotor and accommodated in the housing.

9. A steering apparatus for vehicle according to claim 8, further comprising a cylindrical member surrounding the output member and rotatable together with the output member, and
   the rotor of the reaction-force compensation motor is fixed to the cylindrical member.

10. A steering apparatus for vehicle according to claim 1,
    wherein at least one of the differential-mechanism motor and the reaction-force compensation motor includes a brushless motor.

11. A steering apparatus for vehicle, comprising:
    a steering shaft including a first portion connected to a steering member and a second portion connected to steerable wheels;
    a transmission ratio variable mechanism capable of varying a transmission ratio as a ratio of a steered angle of the steerable wheels to a steering angle of the steering member; and
    a reaction-force compensation motor for compensating a steering reaction force of the steering member caused by an operation of the transmission ratio variable mechanism,
    wherein the transmission ratio variable mechanism includes a differential mechanism for differentially rotatably interconnecting the first and second portions, and a differential-mechanism motor for driving the differential mechanism;
    wherein both an axis of a rotary shaft of the differential-mechanism motor and an axis of a rotary shaft of the reaction-force compensation motor are aligned with an axis of the steering shaft;
    wherein the differential mechanism includes a planet transmission mechanism including a first element connected to the first portion, a second element connected to the second portion, and a third element interconnecting the first and second elements;
    wherein the planet transmission mechanism includes a planet pear mechanism including a first gear as the first element, a second gear as the second element, a planet gear as the third element, and a carrier for the planet gear, an axis of the first gear being aligned with an axis of the second gear, the planet gear being meshed with both the first gear and the second gear, and the carrier supporting the planet gear rotatably about an axis of the planet gear, and being rotatably supported about the axis of the first gear;
    wherein at least one of the first and second gears is a profile shifted gear, profile shift coefficients (including zero) of the first and second gears differing from each other, and a difference between a teeth number of the first gear and a teeth number of the second gear is two.

12. A steering apparatus for vehicle according to claim 11,
    wherein the first portion includes an output member for outputting a steering torque from the steering member to the planet gear mechanism, and
    the first gear is formed integrally with the output member by using a single member, and the second gear is formed integrally with the second portion by using a single member.

13. A steering apparatus for vehicle according to claim 11,
    wherein the first and second gears each include a sun gear.

14. A steering apparatus for vehicle according to claim 11, wherein the teeth number of the first gear, the teeth number of the second gear and a teeth number of the planet gear are each in the range of 10 to 30.

15. A steering apparatus for vehicle according to claim 14, wherein an absolute value of a difference between the profile shift coefficient of the first sun gear and the profile shift coefficient of the second sun gear is in the range of 1.0 to 1.3.

16. A steering apparatus for vehicle according to claim 11, wherein an absolute value of each of the profile shift coefficients of the first and second gears is 1.3 or less.

17. A steering apparatus for vehicle according to claim 11, wherein out of the first and second gears, a gear having a relatively greater teeth number has a relatively smaller profile shift coefficient, whereas a gear having a relatively smaller teeth number has a relatively greater profile shift coefficient.

18. A steering apparatus for vehicle according to claim 11, wherein each of the planet gears meshes with the first gear and the second gear, and
a teeth number of the planet gear meshed with the first gear is equal to a teeth number of the planet gear meshed with the second gear.

19. A steering apparatus for vehicle according to claim 18, wherein a toothed portion of each of the planet gears is integrally formed by using a single member.

20. A steering apparatus for vehicle according to claim 18, wherein a tooth portion of each of the planet gears has the same sectional shape across an overall area thereof with respect to a tooth trace direction.

21. A steering apparatus for vehicle according to claim 11, wherein the two planet gears are arranged with equal spacing in a circumferential direction of the steering shaft.

22. A steering apparatus for vehicle according to claim 3, wherein each of the planet gears includes a toothed portion, and a pair of support shafts oppositely projecting from the toothed portion in an axial direction of the planet gear, and
the carrier includes a first member supporting one support shaft of the pair of support shafts, a second member supporting other support shaft of the pair of support shafts, and a coupling portion for together rotatably interconnecting the first and second members.

* * * * *